United States Patent [19]

Watanabe et al.

[11] 4,278,865
[45] Jul. 14, 1981

[54] GAS SHIELDED STUD WELDING METHOD

[75] Inventors: Hiroyuki Watanabe, Toyotashi; Eiji Miyoshi, Suitashi; Haruo Kojima, Toyotashi; Takeshi Yoshida, Nagoyashi; Masaaki Kato; Shizuo Miyazaki, both of Toyotashi, all of Japan

[73] Assignee: Nippon Stud Welding Co. Ltd., Tokyo, Japan

[21] Appl. No.: 30,467

[22] Filed: Apr. 16, 1979

[30] Foreign Application Priority Data

Apr. 19, 1978 [JP] Japan .................................. 53-45255

[51] Int. Cl.³ .............................................. B23K 9/20
[52] U.S. Cl. ........................................ 219/99; 219/75
[58] Field of Search ....................... 219/74, 98, 99, 75

[56] References Cited

U.S. PATENT DOCUMENTS

| 2,790,066 | 4/1957 | Haynes | 219/74 |
| 3,051,823 | 8/1962 | Craig | 219/74 |
| 3,527,916 | 8/1970 | Ebert | 219/74 |

FOREIGN PATENT DOCUMENTS 290932  6/1965  Netherlands ............................... 219/99

Primary Examiner—E. A. Goldberg
Attorney, Agent, or Firm—Browdy & Neimark

[57] ABSTRACT

A stud welding method uses an inert mixed gas as arc shield in performing stud welding on a base metal, such as, vehicle body, by utilizing the stud, e.g. a T-stud, as an electrode, the stud serving as the positive pole while the base metal serves as the negative pole to thereby prevent formation of oxide film on the base metal surface during the welding, the inert mixed gas comprising carbon dioxide gas and argon gas.

1 Claim, 5 Drawing Figures

GAS SHIELDED STUD WELDING METHOD

BACKGROUND OF THE INVENTION

The techniques for securing studs to various types of base metal, such as for example planting the window frame fixing T-studs to the vehicle body, are known and widely employed in the industry, and heretofore, arc welding has been popularly used as such stud planting means by utilizing both base metal and stud as electrodes of opposite polarities.

However, it has become known that the hitherto used stud welding techniques involve various problems, particularly concerning metal depositability and corrosion resistance.

The problem of metal depositability is mostly associated with the physical conditions of the welding operation, while corrosion resistance has been considered primarily attributable to ageing and other chemical factors after welding, but recent studies have brought to light the fact that the physico-chemical conditions at the time of welding are a decisive factor for corrosion resistance.

As is well known, stud welding is generally practiced by conducting a current of a density corresponding to the stud diameter, but in such welding operation, atmospheric air is taken in for various reasons to form voids that affect metal deposit. In order to overcome such problems, some noval arc shielding techniques have been devised recently. For instance, Japanese Patent Publication No. 20033/75 proposes use of an inert gas singly or in admixture with other gas as an arc shield. Generally, carbon dioxide gas argon gas or such is employed as the shielding gas, and such low-current stud welding method which is capable of providing high mechanical strength and good metal depositability is finding wider and wider applications.

However, even when T-stud welding is performed by using a stored arc stud welder with an improved gas shield, there is inevitably induced deposition of black powder which tends to cause corrosion later, and an analysis of such black powder deposit has revealed that it is a kind of oxide film.

In the case of carbon dioxide gas shield, such oxide film is formed on the base metal 1 as a black powder deposit 3 around the stud 2 as shown in FIG. 1. One of the causes thereof is that the molten drops of arc in the carbon dioxide shielding gas are formed into globules and the so-called globule migration would take place to increase the spatters, resulting in formation of the oxide film in the form of a compound or a mixture. Thus, in this case, there is as much chance of forming an oxide film as in the case of the flash welding where no shield gas is used.

Because of high heat conductivity of carbon dioxide gas, the arc core is large and weld penetration is deep, hence wide bead span and enlarged oxidation area.

In case of using argon gas for arc shielding, the arc core is small and also the bead span is reduced because of low heat conductivity of argon gas, so that although the metal depositability is worsened, the oxidation area is lessened, and hence it looks as if no black powder deposition takes place in this case, but a salt spray test evidently shows that a ring of black powder 4 is formed on the base metal 1 around the stud 2 with a certain spacing therefrom as shown in FIG. 2, thus involving the possibility of forming rust as in the case of said carbon dioxide gas shield.

This is for the reasons that, in the case of argon gas, spray-like impact is given to the base metal by the free ions to let the compound or mixture molecules or particles fly and drift in the area of a given radius and thereby get densified.

Therefore, in use of the conventional stud welding techiques employing a shield gas, there has been taken only individual measures according to the type of the shield gas used, and consideration has been given only to the chemical characteristics of such shield gas.

Accordingly, there was necessitated a troublesome step for mechanically wiping off the black powder as by blushing after stud welding, and this would lead to an elevated cost and the disadvantage that rust is still inevitably formed to a degree, at the weld zone, even if a suitable chemical treatment is made.

SUMMARY OF THE INVENTION

The first object of this invention is to eliminate the said problems of the stud welding method using an inert gas shield according to the conventional techniques, and the second object of this invention is to provide a stud welding method using a mixed shielding gas, or a mixture of carbon dioxide gas and argon gas, to realize excellent weldability and high corrosion resistance, wherein the dualistic conditions of welding using an inert gas shield, that is, the conditions for the shielding inert gas regulation and applied electricity control, are analyzed fundamentally. By realizing the fact that the conventional arrangement to use the base metal as positive pole in the stud welding operation rather increases heat generation to encourage formation of oxide film, such polarity is reversed, that is, arrangement is made such that the base metal serves as negative pole so that the plus ions of argon gas mixed in carbon dioxide gas in a given ratio will be positively attracted to the negative base metal to thereby clear away the black powder which forms the oxide film.

DESCRIPTION OF THE PREFERRED EMBODIMENT

Now, an embodiment of this invention that conforms to the above-said objects is described in detail with reference to FIGS. 3 to 5 of the accompanying drawings.

Figure 1:
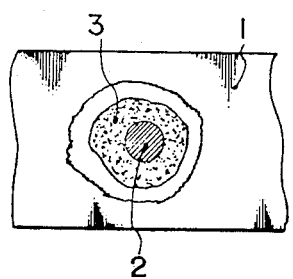
FIG. 1 is a schematic drawing illustrating formation of an oxide film in carbon dioxide gas shielded stud welding according to the conventional techniques.
Figure 2:
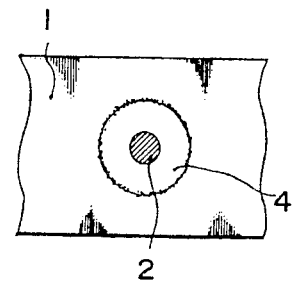
FIG. 2 is a similar drawing illustrating generation of a black ring due to use of argon gas shield according to the conventional techniques.
Figure 3:
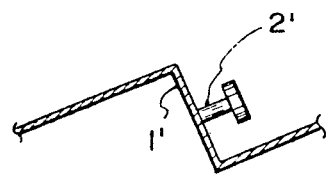
FIG. 3 is a side sectional view of a stud planted to the base metal.

In case of planting a desired number of T-studs 2' by welding to the window frame mounting portion of the body 1' of an automobile as shown in FIG. 3, a stud welding machine supplies a mixed shield gas from both an argon gas bomb and a carbon dioxide gas bomb through respective flow regulating valves.

In this case, polarity is reversed from the conventional pattern, that is, the stud is used as positive pole and the automobile body as negative pole.

This arrangement allows a deeper weld penetration by carbon dioxide gas and a wider bead range, resulting in better metal depositability and mechanical properties. Also, the volume of heat generated is relatively lessened owing to negative polarity of the body or base metal, so that formation of any oxide film is basically inhibited. Further, there is produced a cleaning effect by the impact of the free argon ions against the negative base metal to separate and disperse away the deposited compound and mixture oxides to thereby secondarily inhibit formation of the oxide film.

Of course, in the above-said physical and electrochemical process, the mixed carbon dioxide gas and argon gas penetrate respectively to effect globule migration, spatter expansion and regulation of bead range. The optimum $CO_2$: Ar mixing ratio for the process is for instant set at 2:5 (1/min).

A comparison between the results of experiments conducted according to the above-described embodiment of this invention and the data obtained from the experiments conducted according to the conventional techniques is discussed below.

Figure 4:
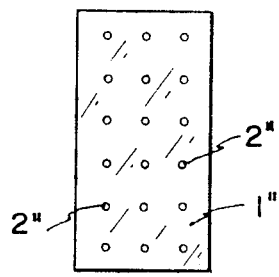
FIG. 4 is a schematic plane view of a sample where a plurality of studs have been planted to the base metal.

As shown in FIG. 4, total 18 unit T-studs 2″ were welded in six lines and three columns with spacing of 30 mm$^2$ from each other on a 100×300 mm, 0.8 mm thick cold rolled steel plate 1″ by using a common type of welder NSA-500E of which the flash shield arrangement at the gun end had been remodeled into a gas shield, obtaining the results shown in Table 1 below.

Regarding "Polarity" in the table, the letter "N" stands for normal type where the stud is negative and the base metal is positive as in the conventional system, and the letter "R" stands for reverse type where the polarity was reversed according to this invention. Each figure in the column of "Weldability test" shows the number of the samples (out of total 18 samples tested) which withstood the peel test. As for "Weld quality", "A" signifies good, "B" rather good, and "C" poor.

TABLE I

| Sample No. | Charging voltage (V) | Polarity | Shielding gas (1/min) Ar | CO$_2$ | Weldability test | Weld quality |
|---|---|---|---|---|---|---|
| 1 | 140 | N | 5 | 0 | 0 | C |
| 2 | 140 | R | 5 | 0 | 6 | C |
| 3 | 140 | R | 0 | 5 | 18 | A |
| 4 | 140 | N | 0 | 5 | 16 | A |
| 5 | 140 | R | 4 | 1 | 15 | B |
| 6 | 140 | R | 4 | 2 | 16 | A |
| 7 | 140 | R | 6 | 1 | 16 | A |
| 8 | 140 | R | 5 | 2 | 17 | A |
| 9 | 140 | R | 5 | 1 | 18 | A |
| 10 | 140 | R | 2 | 5 | 14 | B |
| 11 | 140 | R | 3 | 4 | 18 | A |
| 12 | 140 | R | 4 | 3 | 18 | A |
| 13 | 120 | R | 0 | 5 | 16 | A |
| 14 | 120 | N | 0 | 5 | 18 | A |
| 15 | 120 | R | 5 | 1 | 14 | B |
| 16 | 120 | R | 3 | 4 | 17 | A |
| 17 | 120 | R | 4 | 3 | 16 | A |
| 18 | 120 | R | 5 | 0 | 0 | C |

The following facts are noted from the above-shown data.

(a) In case of using pure Ar gas, the arc is unstable and the weld quality is poor (Sample Nos. 1, 2 and 18).

(b) In case of using pure $CO_2$ gas, the weld quality is generally acceptable and sufficient strength is provided (Sample Nos. 3, 4, 14 and 15).

(c) When $CO_2$ gas is mixed in Ar gas as in Sample Nos. 7, 8, 9 and 15, although the weld quality remains good (A), there is noted a tendency that the silver-colored range is narrowed down and the oxide film is enlarged as the $CO_2$ mixing ratio increases.

(d) On the other hand, when Ar gas is mixed in increasing ratios in $CO_2$ gas as in Sample Nos. 10, 11 and 16, it was found that the weld quality is good (A) while the black powder portion, or oxide film, is lessened.

(e) Comparisons between Sample Nos. 3 and 13, Nos. 4 and 14, Nos. 9 and 15, Nos. 11 and 16 and Nos. 12 and 17 show the fact that low charging voltage discourages formation of oxide film.

(f) It is learned from comparisons between Sample Nos. 1 and 2 and Nos. 3 and 4 that reversed polarity leads to less chance of forming oxide film than normal polarity.

The results of the salt spray corrosion test in stud welding of both normal and reverse polarity types are shown in Table II below. The corrosion resisting duration was shown by way of a comparison between such duration in the case of the normal polarity type and that in the case of the reverse polarity type, by calculating the latter on the basis of the former which was given as 24 hours.

TABLE II

| | Shield gas mixing ratio | | Salt spray corrosion resisting duration | |
|---|---|---|---|---|
| No. | Ar | CO$_2$ | Normal polarity | Reverse polarity |
| 1' | 0 | 100 | 24 | 48 |
| 2' | 20 | 80 | 24 | 72 |
| 3' | 50 | 50 | 24 | 120 |
| 4' | 80 | 20 | 24 | 120 |
| 5' | 100 | 0 | 24 | 72 |

The results given in Table II above show that according to the reversed polarity gas shielded stud welding, a far longer time is required until the same degree of rusting is caused and better corrosion resistance is provided.

Figure 5:
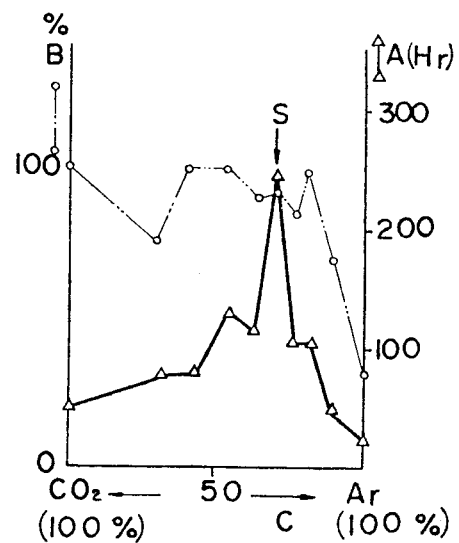
FIG. 5 is a graphic illustration of weldability and corrosion resistance in test samples.

The data obtained from the comprehensive tests of weldability and corrosion resistance conducted on various samples are shown graphically in FIG. 5. In the graph, weldability is plotted on the vertical axis B on the left side and expressed by a double-dotted chain line showing by percent the number of the samples which gave the satisfactory results (A), and the corrosion resisting duration determined by the salt spray test is plotted on the vertical axis A on the right side and expressed by a solid line. The horizontal axis at the bottom indicates the Ar gas mixing ratio rightwise and the $CO_2$ gas mixing ratio leftwise.

As seen from the graph of FIG. 5, the absence of Ar gas results in excellent weldability but poor corrosion resistance, and the most preferred $CO_2$: Ar mixing ratio is around 2:5. These data agree with those obtained from Sample No. 8 in the above-said test of which the results were shown in Table I.

It will be obvious that the studs weldable according to this invention are not limited to T-studs and also the base metal is not limited to an automobile body.

As described above, according to the stud welding method of this invention where the stud and base metal polarities are reversed from the ordinary pattern (so that the stud serves as positive pole and the base metal as negative pole), the volume of heat given to the base metal is lessened to retard activation of oxide film that is formed around the stud, and as a result, there is less chance of causing rusting around the stud.

Another feature of this invention is use of carbon dioxide gas and argon gas as a mixed gas shield for the arc. Carbon dioxide gas allows welding with good metal depositability while argon gas has the effect of producing a cleaning action as the positive ions separated in the arc plasma impinge violently against the negative base metal to strip off the oxide and moisture deposits to prevent attachment of black powder which becomes the base of oxide film, thus further ensuring inhibition of rusting.

Further, by mixing said carbon dioxide gas and argon gas in an optimum ratio, such as $CO_2:Ar=2:5$, it is possible to satisfy simultaneously both requirements for good weldability and high corrosion resistance. Accordingly, there can be eliminated the necessity for mechanical stripping of oxide film as by blushing after welding to allow reduction of the number of steps.

What is claimed is:

1. In a method of welding a stud to a base metal using the stud as an electrode and using an inert mixed gas as an arc shield, the improvement wherein said stud is used as the positive electrode and said base metal as the negative electrode, and wherein said inert mixed shielding gas consists essentially of carbon dioxide and argon in a ratio of approximately two parts of carbon dioxide to five parts of argon.

* * * * *